Oct. 22, 1957  R. F. MOORE  2,810,253
HAY TEDDING MACHINE
Filed Nov. 23, 1955  3 Sheets-Sheet 1
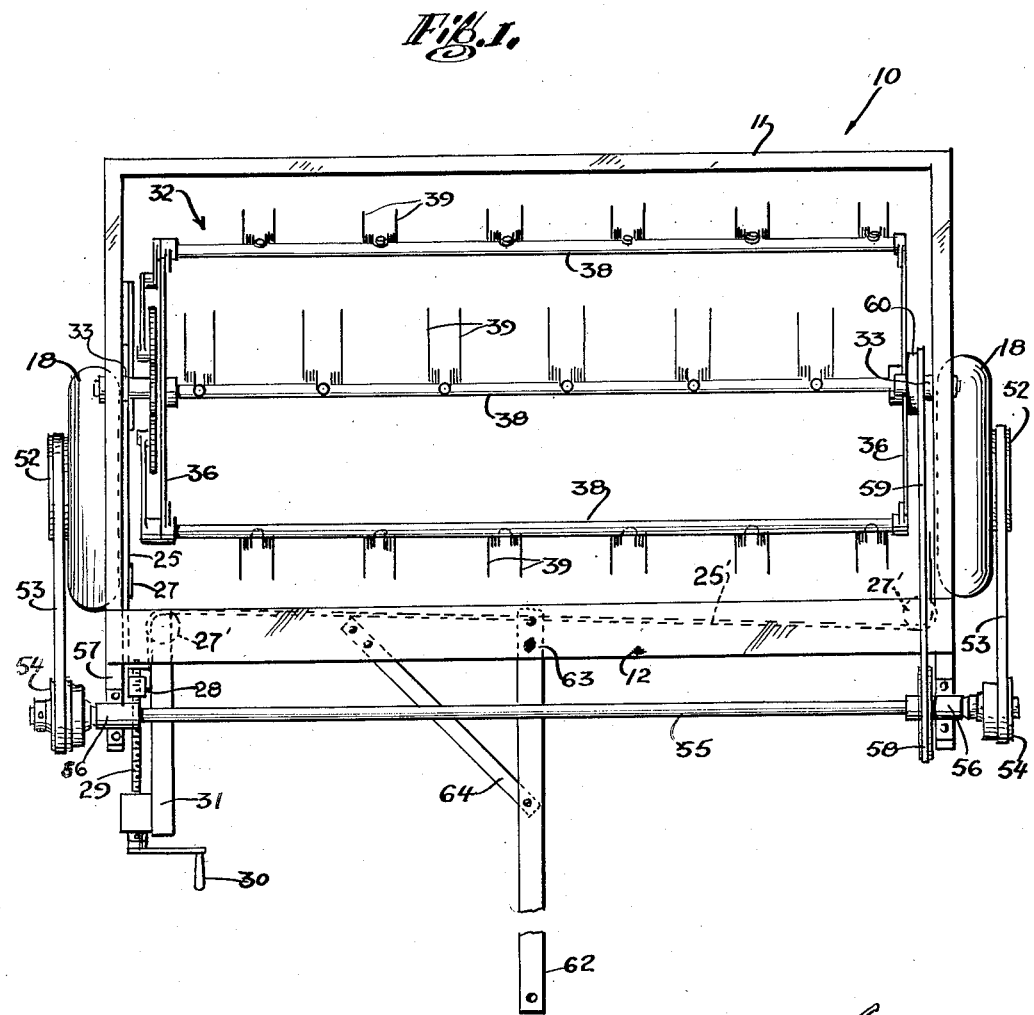
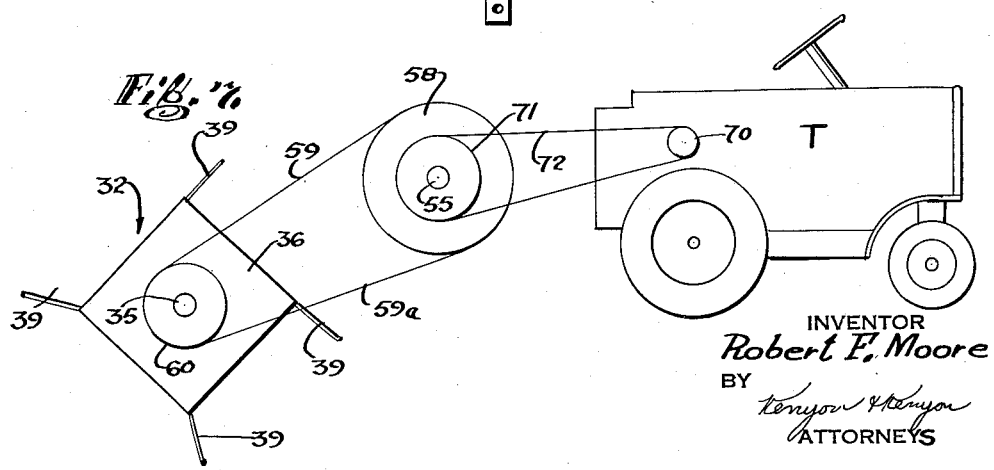
INVENTOR
Robert F. Moore
BY
Kenyon & Kenyon
ATTORNEYS

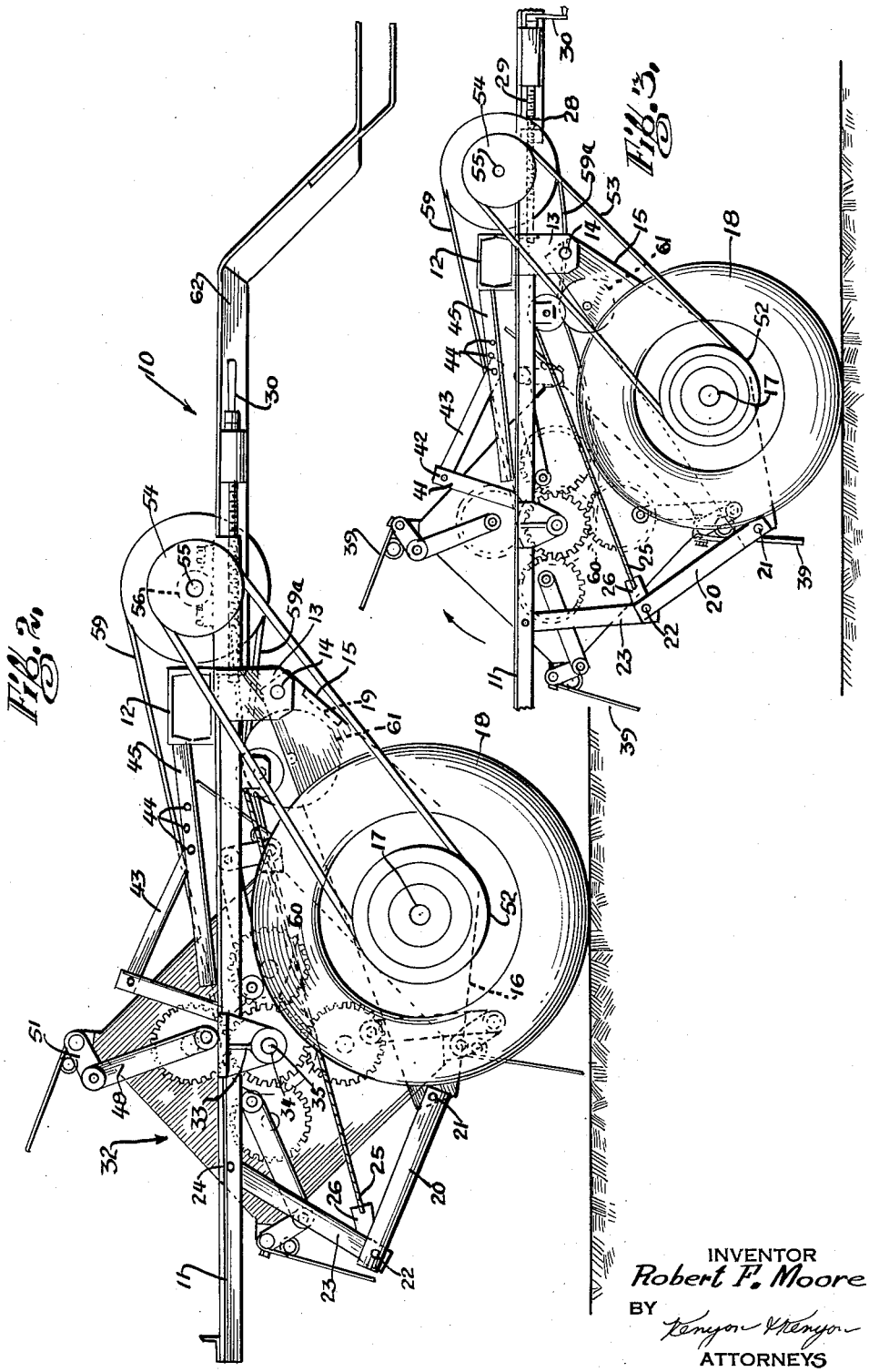

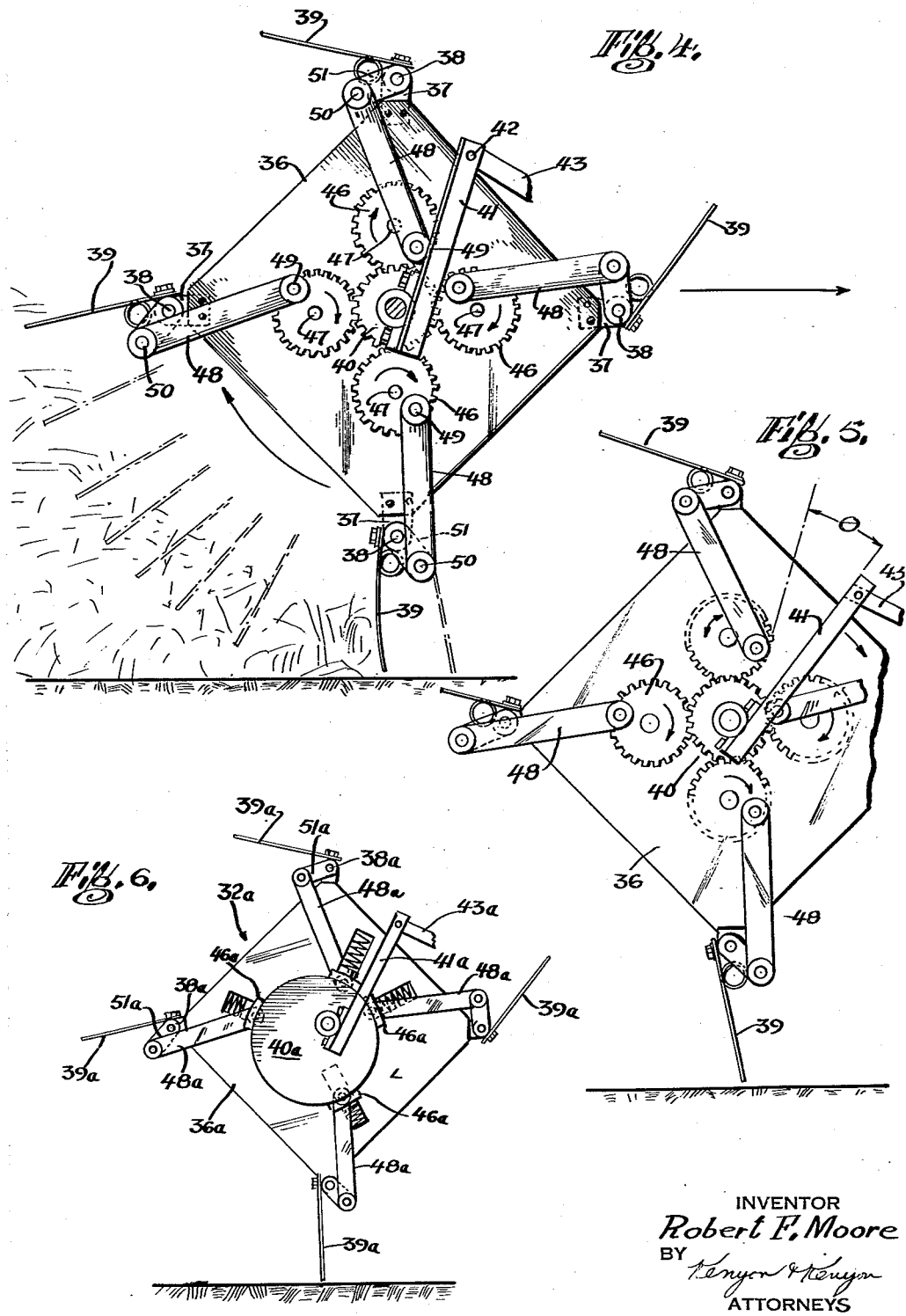

United States Patent Office 2,810,253
Patented Oct. 22, 1957

2,810,253

HAY TEDDING MACHINE

Robert F. Moore, Rutland, Vt.

Application November 23, 1955, Serial No. 548,589

3 Claims. (Cl. 56—372)

This invention relates to farm machinery and more particularly to a drawn vehicle intended for turning over and fluffing up hay or other similar grasses after cutting to get the cuttings up off the ground and out of the stubbles and fluff it for aeration thereby decreasing the drying time and producing a better crop.

The machinery of this invention is intended to be drawn by tractor or other motive power over cut grasses such as hay, clover or alfalfa for the purposes of stirring the cuttings up and turning them over, thus fluffing them up so that air can circulate therethrough thoroughly and enable the sun to dry the cuttings more quickly. The machine is intended to be carried on a two-wheeled frame that preferably is pneumatically tired. The wheels are supported at opposite ends of the frame. Within the frame, a large fork reel is carried. This reel is designed to revolve at high speed. Motive power for turning the reel is derived from a mechanical drive connected to the frame wheels. The forks of the reel are supported by bars carried by the reel. These forks are staggered on their individual supporting bars and thereby provide a better tedding effect than if they were all aligned in circular planes. Where tractors with power take-offs are available, the reel may be driven directly therefrom.

A principal feature of the invention is the provision of means for changing the angular dispositions of the forks during rotation of the reel. By such provision the forks sweep the ground to pick up the hay and thereafter swing on their bars so as to fall back in such a way that the hay drops back to the ground in a turned over and fluffed condition.

Principal objects and features of this invention are the provision of mechanism for effecting the foregoing angular movement of the forks during rotation of the reel.

In one embodiment of the invention this mechanism embodies a sun gear maintained in a stationary condition at one end of the reel and planetary gears that turn with the reel around the sun gear. These planetary gears are connected by links to bell cranks which, in turn, are connected to the reel bars which support the forks. In consequence, when the reel rotates during forward movement of the frame on the wheels, the rotation imparted to the planetary gears in their revolution around the sun gear causes desired angular changes of the disposition of the forks on their reel bars to provide the desired pick-up of hay, its tedding and turning over and fluffing for aeration.

In another embodiment cam means may be substituted for the sun gear and planetary gears.

Other objects and features of the invention are the provision of simple mechanical means for adjusting the height of the reel relative to the ground.

Further objects and features of the invention are the provision of simple means for changing the initial angular disposition of the forks relative to the ground over which they are to operate.

Further objects and features of the invention are the provisions of means for uncoupling the reel when it is elevated out of its usual operative position relative to the ground.

Further objects and features of the invention are the provision of means for permitting free wheeling of the machine during turns.

Further objects and features of the invention are to provide means to facilitate picking up of all of the hay or other crop on level and also on uneven ground.

Further objects and features of the invention will become apparent from the following specification and the accompanying drawings, wherein:

Figure 1 is a plan view of a machine embodying the invention;

Fig. 2 is a side elevation of the machine seen from the left of Fig. 1;

Fig. 3 is a fragmentary similar view showing the machine in an inoperative position;

Figs. 4 and 5 are fragmentary diagrammatic views illustrative of the changes in angular disposition of the forks during rotation of the reel;

Fig. 6 is a diagrammatic view of a cam arrangement for providing angular change of the forks on the reel and Fig. 7 is a diagrammatic view of modified reel rotating means utilizing power take-off from a tractor.

Referring to the drawing, and first to Figs. 1 to 3, inclusive, the machine 10 comprises a generally rectangular reel frame 11 which at the opposite sides of its front cross bar 12 has downwardly depending lugs 13. These lugs 13 provide hinged support at 14 for a running wheel supporting frame 15. Opposite end members 16 of the frame 15 each has a wheel supporting axle 17 located intermediate its ends and appropriate conventional means (not shown in detail) for mounting a wheel 18 thereto. The wheel supporting frame end members 16 are joined by a transverse strut 19 adjacent the hinged connection at 14 so that they will move in unison about the hinge at 14.

Links 20 are pivotally secured at 21, respectively, to the wheel supporting frame members 16 adjacent their free ends. The links 20 in turn are, respectively, pivotally connected at 22 adjacent their free ends to ends of links 23. The other ends of said links 23 in turn are pivotally joined at 24 to the reel frame 11. Each pair of links 20 and 23 comprises a jackknife linkage means that serves to control elevation of the reel frame 11, such control being effected simply by straightening out of the jackknife linkages. In the embodiment shown two pairs of linkages are provided, one located adjacent each side of the machine. The knee actuation of these pairs of linkages is effected by wire cables or ropes 25 and 25' one end of each of which is secured as by a coupling member 26 to a different one of the hinged joints 22 of the respective pairs of linkages. These cables or ropes 25 and 25' are run over appropriate sheaves 27 and 27' revolvably secured to the reel frame 11 and the free ends of said cables or ropes are secured to a longitudinally movable nut 28 mounted on a screw 29 which is operated by a hand crank 30. The screw 29 is carried in an appropriate bracket 31 extending from the front cross bar 12 of the reel frame 11. Rotation of the crank 30 in one or the other direction causes forward or rearward axial movement of the nut 28 along screw 29. Forward movement of said nut 28 tensions the cables or ropes 25 and 25' and tends to straighten out the knees of the jackknife linkages formed of the respective pairs of links 20 and 23 thereby elevating reel frame 11 relative to the ground about hinge 14. Opposite movement of the nut 28 loosens the ropes or cables 25 and 25' and permits the weight of the reel frame 11 and the parts carried by it to collapse the knees of the jackknife linkages and the frame to move downwardly toward the ground about said hinge 14.

A reel 32 is rotatively carried by the reel frame 11,

For this purpose downwardly depending bearing brackets 33 are secured to opposite sides of the reel frame 11. The centers of the holes 34 of these brackets 33 are displaced somewhat rearwardly relative to the corresponding centers of the wheel axles 17 but should be located as closely as possible to vertical alignment with the last-named centers for purposes presently to be described.

A reel carrying shaft 35 spans the bearing brackets 33 and is journaled for rotation in the bearing holes 34 thereof. Symmetrically shaped reel end plates 36 are secured to the reel shaft 35 adjacent its opposite ends and rotate therewith. In the embodiment shown, these reel end plates 36 are substantially square in shape. Radially disposed bearing brackets 37 are located at the corners of these end plates. The corresponding corner located bearing brackets 37 of the respective reel end plates 36 are axially aligned and are spanned by fork carrying bars 38 which are rotatively journaled in said brackets. In the embodiment shown, four bars 38 are provided because of the square shape of reel end plates 36. These end plates could have circular, triangular or other shapes, if desired, and in such cases the number of bars 38 would vary in number, as desired.

Groups of spring fork elements or tines 39 are secured to the respective bars 38 along their lengths. As can be seen clearly in Fig. 1, these fork elements or tines 39 are arranged on their respective bars 38 in staggered or offset relationship with respect to the corresponding elements on adjacent bars 38. Such staggered positioning is found to be more effective and to provide better tedding action on the hay or other cut crops during rotation of the reel frame 32.

A primary feature of the invention is the provision of means to reciprocate the tines or fork elements 39 of each bar 38 angularly in a determined range of angular swing during rotation of the reel 32 on its shaft 35. The changing angle of the fork elements or tines as the reel 32 rotates is of primary importance because, in this way, the fork elements on each succeeding bar 38 sweep the ground in substantially vertical position picking up the hay or other cut crop and carrying it upwardly for part of the reel revolution. Thereafter the forks or elements 39 bearing the hay picked up in this manner are positively swung backwards with their bars 38 in such a way that the hay picked up and carried thereby drops back onto the ground in a turned over and fluffed condition.

In order to provide this desired angular movement of the tines 39 during rotation of the reel 32, the embodiment of Figs. 1 to 5, inclusive, provides a sun gear 40. This sun gear 40 is freely supported on the reel shaft 35 but is secured to an angularly adjustable lever 41. The lever 41 in turn is pivoted at 42 to a link 43 whose other end is removably secured in any one of several spaced apart holes 44 provided in a fixed bar 45 carried by the reel frame across bar 12. This arrangement permits a limited angular change $\theta$ of the sun gear 40 for purposes presently to be described.

Independent gears 46 are supported on axles 47 carried by one of the reel end plates 36 so that these gears 46 mesh with the sun gear 40 and rotate in planetary meshed relationship about said gear 40 when the reel 32 revolves and simultaneously turn on their own axles 47. Connecting rods 48 are pivotally attached at one end to off center crank pins 49 on the respective gears 46. The opposite ends of these rods 48 in turn are secured pivotally at 50 to respective cranks 51 fastened to respective fork bars 38 and which as seen clearly in Figure 4, always extends transversely and rearwardly with respect to the bars and reel 32 during rotation of the latter. In consequence, during each revolution of the reel 32, the rotation of the individual gears 46 about sun gear 40 will cause angular reciprocal movement of the respective fork bars 38 and fork elements secured thereto. The reciprocal angular travel path of each group of fork elements or tines 39 on its bar 38 is a function of the dimensions of the gears 40 and 46 as well as connecting rods 48 and cranks 51 and can be selected to provide any desired reciprocal angular swing of the tines 39.

A different embodiment of means for effecting angular swing of the tines is depicted in Fig. 6 wherein the eccentrically mounted circular cam disc 40a replaces the sun gear 40. Spring biased cam members 46a replace the gears 46. These cam members 46a are maintained in contact with the periphery of cam disc 40a by their springs. The inner ends of connecting rods 48a are pivotally secured to respective cam members 46a while their outer ends are connected to the cranks 51a mounted on the tine carrying fork bars 38a so that fork tines 39a will be angularly reciprocated with these bars 38a on rotation of reel 32a in the same way as fork tines 39. The levers, 41a and 43a, serve in the same way to adjust the cam disc 40a as do levers 41 and 43 associated with sun disk 40. Other conventional ways of securing reciprocal angular motion of the tines may be utilized.

The reels 32 and 32a preferably are driven by rotation of the wheels 18 in forward motion of the machine 10. To this end, sheaves 52 are mounted on the wheel axles 17 for rotation with the wheels 18. These sheaves 52 in turn are connected or coupled, for example, through endless bands such as V-belts 53, respectively, with ratchet including end sheaves 54 carried on a transverse shaft 55 which latter is journaled in bearings 56 carried by bracket extensions 57 secured to the reel frame 11. The internal ratchets (not shown) of the end sheaves 54 allow for free wheeling turns of the wheels 18 without imparting driving rotation to the shaft 55 by the inside wheel on a turn. In fact, these ratchets also provide for one way drive only of the shaft 55 during forward motion of the machine 10.

Another sheave 58 is secured to the transverse one-way driven shaft 55. A loose drive coupling, such as an endless band or V-belt 59, connects sheave 58 to a sheave 60 (Fig. 1) secured to the reel shaft 38. The lower flight 59a of band or belt 59 passes over a freely rotatable flange pulley wheel 61 (Fig. 2) which is suitably supported from one of the wheel frame members 15. When the reel 32 is in an elevated position as a result of unfolding of the jackknife linkages under crank operation of the cables or ropes 25, the lower flight of belt 57 does not press on pulley wheel 61. In consequence, the belt 59 is loose and slips. No rotation of reel 32 therefore occurs. When reel 32 is lowered to the operative position shown in Fig. 2 by closing movement of the jackknife linkages, the lower flight 59a of belt 59 is lowered and pressed against pulley wheel 61 so that the belt 59 is sufficiently tightened to transmit driven rotation of sheave 58 to sheave 60 and thus revolve reel 32 during forward movement of the machine 10. Since both wheels 18 independently transmit their forward rotation to shaft 55 the reel 32 is driven even during the execution of turns made during forward motion of the machine. In other words, rotation of the reel 32 is continuous during all forward and all forward turning movements of the machine but it will not be revolved during rearward or reverse machine movements.

A traction bar 62 secured in conventional manner as by bolts 63 to the reel frame bar 12 and braced by a bar 64 may be coupled to conventional hitching mechanism on a tractor (not shown) or to any other convenient tractive motive power.

In operation of the device the crank 30 is rotated in necessary direction to adjust the reel frame 11 by knee action of the jackknife linkages to desired elevation above the ground at which time the fork elements or tines 39 or 39a of the lowermost fork bar 38 of the reel frame 32 (the one in the six o'clock position) should just clear the ground surface. At this time the lower flight 59a of the drive belt 59 will press on the pulley wheel 61 so that the belt 59 is tight. Likewise, at this time the fork members or tines 39 on said lowermost fork bar 38 extend substantially vertically.

The machine is then drawn forwardly over the cut crop in the field. Immediately, as forward motion of the machine commences, its wheels 18 start to turn in forward direction and like directional rotation at higher speed is imparted to the reel 32 via the belts 53 and 59. This rotation causes lowermost fork members or tines 39 approaching the six o'clock position to engage with the cut hay or other grass under them by positively moving into and lifting and tossing it upward. At the same time the rotary movement of lowermost of the gears 46 revolving about sun gear 40 through its associated connecting rod 48 and crank 51 begins to swing the tines 39 moving from the six to nine o'clock position first in a clockwise direction or positively into the hay despite forward motion of the vehicle as a whole to approximately a position 30° beyond the six o'clock position at which time the pivot 50 passes low dead center. This insures positive biting into engagement and elevation of the hay engaged by the tines to approximately 15 inches above the ground. Beyond the said 30° position because the pivot 50 then passes said dead center, crank 48 effects counter clockwise rotation of the cranks during continued clockwise rotation of reel 32. As they continue to rise above ground level, they remain at a substantially unchanged angle relative to the hay because their relative velocity falls so that as the hay is further elevated, the rising tines 39 are pulled freely out of the hay without entangling action thereon. Thus the hay is elevated, turned over and released, falling back to the ground in a turned over and fluffed condition. Each succeeding group of fork members or tines 39 on respective bars 38 act similarly upon the hay in their movements between the six and nine o'clock positions of the rotating reel as the machine is drawn forwardly over the hay field or turned during its forward movement. Similar action occurs with forks 39a of the embodiment of Fig. 6.

As depicted in both modifications, the tines 39 or 39a of the group in the six o'clock position are disposed substantially vertically. This initial angle of attack position of the tines can be changed to a different one simply (as shown in Fig. 5) by changing the position of the levers 41 or 41a by any desired angle θ and securing lever 43 or 43a in its adjusted position by securing it in selected different ones of the holes 44 on their counterparts (not shown) in the modification of Fig. 6. Once such an adjustment is made by the operator it need not be changed unless different haying conditions occur.

The provision of the reciprocal angularly swinging fork members or elements 39 or 39a operated respectively by cranks 51 or 51a and rods 48 or 48a on the rapidly rotating reels 32 or 32a provides postive turning over and fluffing of hay or other similar cut crops as such machines are drawn over the field, getting the cut crops off the ground and out of the stubbles, thus decreasing drying time and producing a better crop. Moreover, the staggered relationship of the fork members or elements 39 or 39a on the different fork bars 38 or 38a result in better tedding action on the cut crops as the machine is drawn over them. In action the hay can actually be elevated about 15 inches before the fork members in moving from the six to nine o'clock positions start folding back under action of gears 46 to release the picked up hay and permit it to drop back to the ground in a turned over condition. In addition, the disposition of the center of rotation of reel and of the wheel as closely as possible to vertical alignment results in picking up of substantially all cuttings both on level and on uneven ground.

In some of the embodiments shown the rotation of the reels 32 or 32a is effected by driving couplings with the wheels 18 of the device as has been described. The reel drive, however, may be effected in other ways. For example, as shown in Fig. 7 a power take-off pulley 70 is a conventional adjunct of tractors. If the device of this invention is intended to be hauled by such a tractor T its construction can be simplified to eliminate the drive coupling 53 between wheels 18 and the reels 32 or 32a, as well as the sheaves 52 and 54. Instead of sheaves, a single sheave 71 is secured on the shaft 55 for coupling by an endless band 72 to the tractor take-off pulley 70. In this way when pulley 70 is driven by the tractor engine its rotation is transmitted to shaft 55 by band 72 and the driven rotation of shaft 55 is transmitted via belt 59 to sheave 60 with consequent rotation of the reel 32. If desired, sheave 71 can be equipped with a ratchet mechanism like that used in sheaves 54 to insure rotation of reel 32 only in one direction.

The simplification of Fig. 7 makes it possible to produce a commercial model at slightly lower cost for sale to users who already own tractors having power take-off arrangements.

While specific embodiments of the invention have been described and shown structural variations within the scope of the appended claims are possible and are contemplated. There is no intention, therefore, of limitation to the exact details shown and described.

What is claimed is:

1. Farm machinery of the character described comprising a wheel supported frame, a revolvable reel carried by said frame and movable with it over the ground, said reel comprising a reel shaft rotatably mounted on said frame, end plates secured to said shaft, bar members rotatably supported by and extending between said end plates, tines secured to the bars and extending transversely of the axes thereof, a sun member supported on said reel shaft, means on the frame to rotate said reel member in one direction, means secured to said sun member and engaged by said frame to prevent rotation of said sun member during rotation of said reel, cranks secured to said bars to extend transversely and rearwardly with respect to the bars and reel when rotating, planetarily movable members carried by one of said end members and movable around said sun member in engagement therewith during rotation of said reel, and connecting rods coupled to said cranks and to said planetarily movable members whereby rotation of said reel will cause said planetary members to impart angular reciprocal rotation to said tines via said connecting rods and cranks such that said tines will be moved to effect positive engagement with cut crops in the direction of rotation of said reel and pick up of said cut crops and carry the latter upwardly to a selected height above the ground and thereafter move reversely to facilitate withdrawal from the picked up crops which then fall to the ground in a turned over and fluffed condition.

2. The farm machinery of claim 1 wherein said sun member is a sun gear and said planetary members are gears meshing with the sun gear.

3. The farm machinery of claim 1 wherein said sun member is a circular disc eccentrically supported on the reel shaft and said planetarily movable members are cam followers movable around said disc and spring biased into engagement therewith.

References Cited in the file of this patent

UNITED STATES PATENTS

| 26,380 | Stoddard | Dec. 6, 1859 |
| 97,677 | Myers | Dec. 7, 1869 |
| 111,041 | Butterworth | Jan. 17, 1871 |
| 2,667,027 | Hauswirth | Jan. 26, 1954 |
| 2,672,005 | Hamilton | Mar. 16, 1954 |